United States Patent
Lu

(10) Patent No.: US 9,427,724 B2
(45) Date of Patent: Aug. 30, 2016

(54) SPONGE-LIKE POLYMERIC ADSORPTION MATERIAL

(71) Applicant: SOOCHOW UNIVERSITY, Suzhou (CN)

(72) Inventor: Jianmei Lu, Suzhou (CN)

(73) Assignee: Soochow University, Suzhou (CN)

( * ) Notice: Subject to any disclaimer, the term of this patent is extended or adjusted under 35 U.S.C. 154(b) by 210 days.

(21) Appl. No.: 14/307,737

(22) Filed: Jun. 18, 2014

(65) Prior Publication Data

US 2015/0011387 A1    Jan. 8, 2015

(30) Foreign Application Priority Data

Jul. 3, 2013   (CN) .......................... 2013 1 0277549

(51) Int. Cl.
| | |
|---|---|
| *B01J 20/26* | (2006.01) |
| *B01J 20/28* | (2006.01) |
| *C09K 3/32* | (2006.01) |
| *D01F 6/04* | (2006.01) |
| *D01F 6/16* | (2006.01) |
| *D01F 6/20* | (2006.01) |
| *D06M 13/02* | (2006.01) |
| *D06M 13/224* | (2006.01) |

(52) U.S. Cl.
CPC ......... *B01J 20/28038* (2013.01); *B01J 20/267* (2013.01); *B01J 20/28045* (2013.01); *C09K 3/32* (2013.01); *D06M 13/02* (2013.01); *D06M 13/2246* (2013.01); *D01F 6/16* (2013.01); *D01F 6/20* (2013.01)

(58) Field of Classification Search
None
See application file for complete search history.

(56) References Cited

U.S. PATENT DOCUMENTS

2012/0215148 A1*   8/2012   Ewert ...................... D01D 5/14
602/45

FOREIGN PATENT DOCUMENTS

JP        2014-172959    *    9/2014    ........... C08G 77/388

* cited by examiner

*Primary Examiner* — Daniel Berns
(74) *Attorney, Agent, or Firm* — SZDC Law P.C.

(57) ABSTRACT

A sponge-like polymeric adsorption material prepare by a process including: preparing a linear polymer yarn from a linear polymer via melt-blow spinning, treating the linear polymer yarn with a crosslinking agent and a porogen agent; heating the treated linear polymer yarn at 130 to 150° C. for 25 to 35 seconds to obtain a fibrous polymeric adsorption material; and weaving the fibrous polymeric adsorption material to obtain the sponge-like polymeric adsorption material. The linear polymer has a molecular weight of 15,000 to 20,000 g/mol. The fibrous polymeric adsorption material includes fibers with a diameter of 4 to 6 microns. The crosslinking agent is in an amount of 1 to 3 weight % of the linear polymer. The crosslinking agent is a diacrylate ester compound having Formula J1, J2 or J3. The porogen agent is in an amount of about 1 weight % of the linear polymer. The sponge-like polymeric adsorption material has a thickness of 15-20 mm and a density of 600-720 g/L. The linear polymer has a molecular weight of 15,000 to 20,000 g/mol.

5 Claims, No Drawings

SPONGE-LIKE POLYMERIC ADSORPTION MATERIAL

The present invention claims priority to Chinese Patent Application No. 201310277549.0, filed on Jul. 3, 2013.

BACKGROUND OF THE INVENTION

The present invention relates to a sponge-like polymeric adsorption material.

With the development of industrialization, global environmental pollution has become a serious problem due to various accidents of organism and oil leaking, which caused rivers, oceans, and other water pollution. Sudden and frequent accidents that need urgent solution still exist. Sudden water pollution has characteristics of large contaminated area and unstable objects.

Dispersants are currently widely used for oil spill. Dispersants include a variety of surfactants and solvents with strong permeability. The mechanism of action is to emulsify the oil slick to form small particles dispersed in water. Because dispersants can increase the contact interface between oil and water, the oil is more easily diffused in the water, resulting in a larger area of contamination. Moreover, chemical composition of dispersants will bring secondary pollution to the water environment.

Adsorption technology uses an adsorbent material to treat harmful substances existed in the environment to achieve the purpose of treatment, preventing damages to the environment. The core of the technology is the adsorbent material. The traditional adsorption material activated carbon and related technologies have some defects in adsorption efficiency and technological operation, and are unable to meet the treatment requirements of industrialization. For example, when granular activated carbon used for the disposal of sudden water pollution accident, the flow of water in a large area would affect the adsorption efficiency of toxic organic, requiring the development of new and effective absorbent material to disposal sudden water pollution accidents.

SUMMARY OF THE INVENTION

One embodiment provides a sponge-like polymeric adsorption material prepare by a process including preparing a linear polymer yarn from a linear polymer via melt-blow spinning, treating the linear polymer yarn with a crosslinking agent and a porogen agent; heating the treated linear polymer yarn at 130 to 150° C. for 25 to 35 seconds to obtain a fibrous polymeric adsorption material; and weaving the fibrous polymeric adsorption material to obtain the sponge-like polymeric adsorption material. The linear polymer has a molecular weight of 15,000 to 20,000 g/mol. The fibrous polymeric adsorption material includes fibers with a diameter of 4 to 6 microns. The crosslinking agent is in an amount of 1 to 3 weight % of the linear polymer. The crosslinking agent is a diacrylate ester compound having Formula J1, J2 or J3:

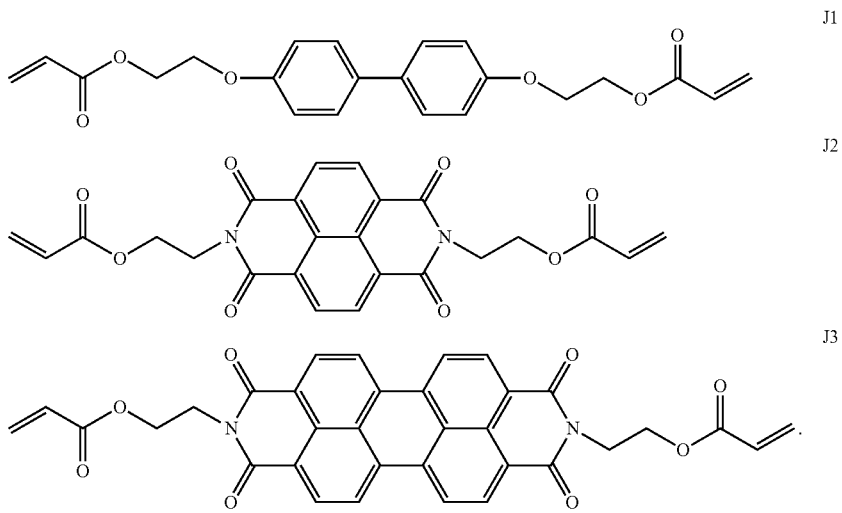

The porogen agent is in an amount of about 1 weight % of the linear polymer. The sponge-like polymeric adsorption material has a thickness of 15-20 mm and a density of 600-720 g/L.

Another embodiment provides the linear polymer is a linear long chain ester of methacrylic acid, a methacrylic acid alkyl ester, a 9-(12-((4-vinylbenzyl)oxy)dodecyl) fused ring aromatic hydrocarbon, or a 12-(fused-aromatic-ring-9-yl)dodecyl ester. The long chain ester of methacrylic acid has a $C_6$-$C_{18}$ straight alkyl chain. The methacrylic acid alkyl ester has a $C_1$-$C_6$ straight-chain alkyl. The fused ring aromatic hydrocarbon is benzene, naphthalene, or anthracene.

Another embodiment provides a melting point of the linear polymer is about 150° C.

Another embodiment provides the porogen agent is modified paraffin.

Another embodiment provides the modified paraffin is prepared by a process including: mixing solid paraffin with an aqueous dispersant solution, stirring the mixture of the solid paraffin and the aqueous dispersant solution at 60-100° C., adding an acrylate monomer and benzoyl peroxide to the mixture of the solid paraffin and the aqueous dispersant solution to initiate a polymerization reaction, running the polymerization reaction for 2.5 to 4 hours; and placing the mixture into water to obtain the modified paraffin. The aqueous dispersant solution has a concentration of 1-100 mg/mL. The aqueous dispersant solution includes gelatin and hydroxyethyl cellulose, and a weight ratio of gelatin and glycolate cellulose is 1:2. The amount of benzoyl peroxide is 1-3 weight % of the acrylate monomer.

It is to be understood that both the foregoing general description and the following detailed description are exemplary and explanatory and are intended to provide further explanation of the invention as claimed.

DETAILED DESCRIPTION OF THE INVENTION

The present invention relates to a sponge-like polymeric adsorption material. The sponge-like polymeric adsorbent material has a fast absorption rate, large adsorption capacity, and good strength and is reusable.

The present invention adopts the following technical schemes:

The sponge-like polymeric adsorbent material is obtained via weaving the a fibrous polymeric adsorption fiber. The thickness of the sponge-like polymeric adsorbent material is 15~20 mm, and the density of the polymeric adsorbent material is 600~720 g/L.

The sponge-like polymeric adsorption material can be prepared by the following steps: a linear polymer yarn can be prepared from a linear polymer (molecular weight: 15000 to 20000 g/mol) via melt-blow spinning; the yarn can then be treated with a crosslinking agent and a porogen agent; the treated yarn can be heated at 130-150° C. for 25-35 seconds to obtain a fibrous polymeric adsorption material; and the fibrous polymeric adsorption material can be weaved to obtain a sponge-like polymeric adsorption material. The amount of crosslinking agent used can be about 1.5 weight % of the linear polymer and the amount of porogen can be about 1 weight % of the linear polymer. The fibrious polymeric adsorption material can include fiber with a diameter of 4 to 6 microns.

The crosslinking agent can be a diacrylate ester compound having formula J1, J2 or J3:

The porogen agent can be modified paraffin, which can be prepared by following process. Solid paraffin can be mixed with an aqueous dispersant solution. The aqueous dispersant solution has a concentration of 1-100 mg/mL. The mixture of solid paraffin and the aqueous dispersant solution was stirred at 60-100° C. to obtain a homogenous mixture. Acrylate monomers and benzoyl peroxide can be added drop-wise to the mixture of solid paraffin and the aqueous dispersant solution under stirring to initiate a polymerization reaction. The polymerization reaction can be run for 2.5 to 4 hours. The reaction mixture can then poured into water rapidly to give modified paraffin as a solid particle.

The dispersing agent can include gelatin and hydroxyethyl cellulose, and the weight ratio of gelatin and glycolate cellulose is 1:2. The amount of benzoyl peroxide is 1-3 weight % of acrylate monomers.

The linear polymer can be a linear long chain esters of methacrylic acid, or methacrylic acid alkyl ester, a 9-(12-((4-vinylbenzyl)oxy)dodecyl) fused ring aromatic hydrocarbon or 12-(fused-aromatic-ring-9-yl)dodecyl ester. The long chain esters of methacrylic acid can have a $C_6$-$C_{18}$ straight alkyl chain. Methacrylic acid alkyl esters can have $C_1$-$C_6$ straight-chain hydrocarbons. The fused ring aromatic hydrocarbon can be benzene, naphthalene, anthracene, or anthracene.

The melting point of the linear polymer is preferably about 150° C.

In the above technical solution, the crosslinking agent can be a liquid, and the porogen can be melted under heat treatment. Melt-blow spinning is also a conventional technique.

Cross-linking agents J1, J2, J3 can be prepared by following procedures: 4,4'-biphenol, naphthalene tetracarboxylic dianhydride, and perylene dianhydride react with 1-chloro-ethanol, 2-aminoethanol and 2-amino-ethanol, respectively, to obtain 2-position substituted alcohol intermediates, and then the intermediates are condensed with acryloyl chloride in pyridine solution to synthesize crosslinking agents J1, J2 and J3, respectively.

The above crosslinking and pore-forming process is very important. Spinning-crosslinking technique used here not only ensures the polymer meet the requirements of spinning, but also the obtained fiber has an excellent strength; porogen

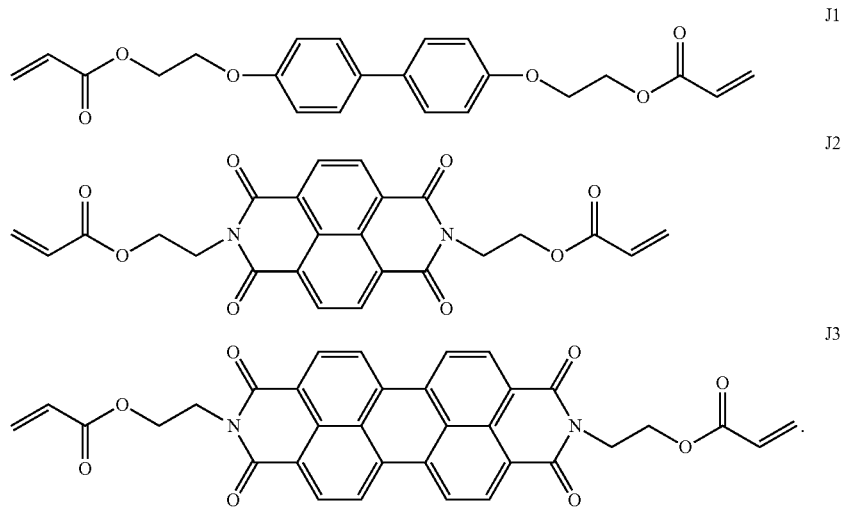

can form a porous structure in fibers, thus effectively increase the surface area, the lipophilic groups not only exist on the fiber surface, but also in the micro-pores, further improving the adsorption rate and capacity of the fiber.

In the present invention, the thickness and density of sponge-like polymeric adsorption material are very important for practical applications. If too thin, the adsorption material would have a poor strength and cannot tolerate the impact of water and mechanical forces, which cannot meet the requirements of dealing with a sudden accident. If too thick, the adsorption capacity would be affected and cannot meet the requirements of quickly disposing of sudden incident. Low density can affect the oil-holding performance, and high density can affect the adsorption rate. Thus, products with different densities can be used to meet different application requirements. For example, high density adsorption material can be used for low viscosity organism, and low density adsorption material can be used for refined oil products or crude oil. The thickness and density of sponge-like polymeric adsorption material can be controlled when the fibrous polymeric adsorption material is weaved.

The overall process of the present invention is as follows:

Polymer→Flow control pump→Melt blowing→Melt extruding and cooling→Dipping→Pore-forming and cross-linking→Fiber collecting→Weaving Due to the using of the above technical solutions, the present invention has the following advantages:

The thickness and density of the sponge-like polymeric adsorption material can be well controlled. The material has a large adsorption capacity, rapid adsorption rate and good strength, which can meet the treatment of sudden accidents, especially fast response for disposal of oil spill; the material cannot damage the environment, is suitable for industrial applications.

A better understanding of the present invention may be obtained in light of the following Examples which are set forth to illustrate, but are not to be construed to limit the present invention.

Example 1

Preparation of a Fibrous Polymeric Adsorption Material

A linear polymer was synthesized by a conventional synthetic method. The molecular weight of the linear polymer is around 15000 to 20000 g/mol, and the melting-point is 150° C. A linear polymer yarn was prepared from the linear polymer via melt-blow spinning. The yarn was then treated with a crosslinking agent and a porogen agent. The treated yarn was subject to a rapid (35 seconds) low temperature (140° C.) crosslinking process to obtain the fibrous polymeric adsorption material. The fibrous polymeric adsorption material includes fibers with a diameter of 4 to 6 microns. The amount of crosslinking agent used is 1.5 weight % of the linear polymer, and the amount of porogen is 1 weight % of the linear polymer mass. The fibrous polymeric adsorption material has a high adsorption rate, and the saturation adsorption time is much shorter than the current commercial materials (4 to 6 hours).

The linear polymer is poly {methyl octadecyl acrylate-methacrylate hexyl acrylate-[9-(12-((4-vinylbenzyl)oxy)do-decyl)anthracene]}. The crosslinking agent is a diacrylate compound J1:

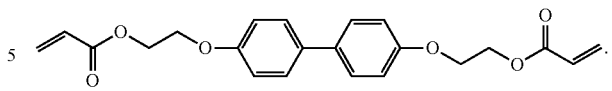

Synthesis of Crosslinking Agent J1

4,4'-dihydroxybiphenyl (20 mmol) and ethylene chlorohydrin (40 mmol) in 2N sodium hydroxide solution (1.6 g, 10 mL water) was heated to reflux for 2 h, and the mixture was then stirred at room temperature for 10 hours and extracted with dichloromethane (3×30 mL), 10% sodium hydroxide (50 mL) and water (3×30 mL), and dried over with anhydrous magnesium sulfate. The solvent was distilled to obtain an intermediate product.

At 0° C., acryloyl chloride (10 mmol) was added dropwise to the above intermediate product (10 mmol) pyridine (30 mL) solution. The mixture was stirred at room temperature for 12 hours, poured into ice water, and then extracted with ether (3×60 mL), 5% hydrochloric acid (60 mL) and water (3×60 mL), dried over with anhydrous magnesium sulfate, and purified by column chromatography (dichloromethane/petroleum ether) to obtain the product crosslinker J1.

Example 2

Preparation of a Sponge-Like Polymeric Adsorbent Material

The fibrous polymer fiber prepared in Example 1 was weaved at a speed of 5-10 meter/minute to obtain the sponge-like polymeric adsorbent material. The thickness and density of the sponge-like polymeric adsorbent material were controlled to obtain a series of products that are suitable for emergencies caused by different pollutants and unexpected accident. A nonwoven fabric tensile testing machine was used to test the strength of the products. Table 1 shows the strength of the products (density: 650 g/L), and Table 2 shows the relationship between the density and the adsorption performance and strength of the products (adsorption object: toluene; thickness: 18 mm).

TABLE 1

Relationship between the strength and thickness of the product

| Thickness mm | 6 | 9 | 12 | 15 | 18 | 20 |
|---|---|---|---|---|---|---|
| Strength | weak | weak | average | strong | very strong | very strong |

TABLE 2

Relationships among the density, adsorption properties and strength of the product

| Density g/L | 465 | 490 | 550 | 600 | 650 | 700 | 720 |
|---|---|---|---|---|---|---|---|
| Adsorption Ratio g/g (tolune/product) | 13.2 | 13.0 | 13.1 | 13.3 | 13.4 | 12.5 | 12.0 |
| Strength | Weak | Weak | Average | Strong | Very Strong | Very Strong | Very Strong |

What is claimed is:

1. A polymeric adsorption material prepared by a process comprising:
    preparing a linear polymer yarn from a linear polymer via melt-blow spinning, the linear polymer having a molecular weight of 15,000 to 20,000 g/mol;
    treating the linear polymer yarn with a crosslinking agent and a porogen agent;
    heating the treated linear polymer yarn at 130 to 150° C. for 25 to 35 seconds to obtain a fibrous polymeric adsorption material; and
    weaving the fibrous polymeric adsorption material to obtain the polymeric adsorption material,
    wherein the fibrous polymeric adsorption material includes fibers with a diameter of 4 to 6 microns;
    wherein the crosslinking agent is in an amount of 1 to 3 weight % of the linear polymer;
    wherein the crosslinking agent is a diacrylate ester compound having Formula J1, J2 or J3:

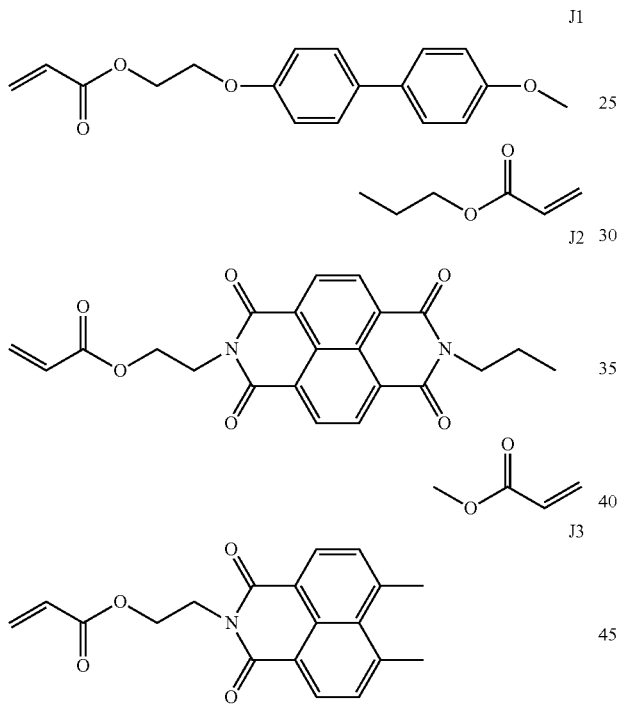

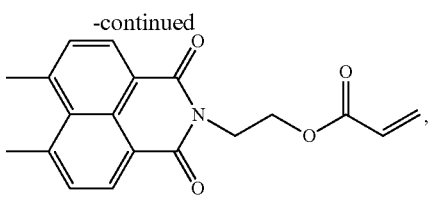

wherein the porogen agent is in an amount of about 1 weight % of the linear polymer, and wherein the polymeric adsorption material has a thickness of 15-20 mm and a density of 600-720 g/L.

2. The polymeric adsorption material of claim 1, wherein the linear polymer is a linear long chain ester of methacrylic acid, a methacrylic acid alkyl ester, a 9-(12-((4-vinylbenzyl)oxy)dodecyl) fused ring aromatic hydrocarbon, or a 12-(fused-ring-aromatic-hydrocarbon-9-yl)dodecyl ester, the long chain ester of methacrylic acid having a $C_6$-$C_{18}$ straight alkyl chain; the methacrylic acid alkyl ester having a $C_1$-$C_6$ straight-chain alkyl; and the fused ring aromatic hydrocarbon being anthracene.

3. The polymeric adsorption material of claim 1, wherein a melting point of the linear polymer is about 150° C.

4. The polymeric adsorption material of claim 1, wherein the porogen agent is modified paraffin.

5. The polymeric adsorption material of claim 4, wherein the modified paraffin is prepared by a process comprising:
    mixing solid paraffin with an aqueous dispersant solution, the aqueous dispersant solution having a concentration of 1-100 mg/mL;
    stirring the mixture of the solid paraffin and the aqueous dispersant solution at 60-100° C.;
    adding an acrylate monomer and benzoyl peroxide to the mixture of the solid paraffin and the aqueous dispersant solution to initiate a polymerization reaction;
    running the polymerization reaction for 2.5 to 4 hours; and
    placing the mixture into water to obtain the modified paraffin,
    wherein the aqueous dispersant solution includes gelatin and hydroxyethyl cellulose; and wherein the amount of benzoyl peroxide is 1-3 weight % of the acrylate monomer.

* * * * *